United States Patent [19]

Groswith III et al.

[11] Patent Number: 4,874,186

[45] Date of Patent: Oct. 17, 1989

[54] PAPER SHEETS BINDING SYSTEM

[75] Inventors: Charles T. Groswith III, Los Altos; Edwin A. Seipp III, Menlo Park; Rickson Sun; James R. Yurchenco, both of Palo Alto, all of Calif.

[73] Assignee: Taurus Holdings, Inc., Mountain View, Calif.

[21] Appl. No.: 120,069

[22] Filed: Nov. 13, 1987

[51] Int. Cl.$^4$ .................. B42D 1/00; B42F 13/30; B42F 3/00; F16B 35/04
[52] U.S. Cl. ............................. 281/28; 402/48; 411/378; 24/67 P
[58] Field of Search ............ 281/21 R, 25 R, 28; 411/378, 427, 457, 458, 508, 509, 514; 412/7, 38; 402/5, 48; 24/67 PR

[56] References Cited

U.S. PATENT DOCUMENTS

| | | | |
|---|---|---|---|
| 30,783 | 5/1899 | Washburn | 411/378 |
| 635,409 | 10/1899 | Sickle | 24/67 PR |
| 1,975,971 | 10/1934 | Nothnagel | 24/67 PR |
| 2,529,420 | 11/1950 | Ramquist | 411/509 |
| 3,053,357 | 9/1962 | Stanger | 411/427 |
| 3,647,306 | 3/1972 | Chamberlin | 402/48 |
| 4,175,880 | 11/1979 | Muller | 402/48 |
| 4,302,123 | 11/1981 | Dengler et al. | 402/6 X |
| 4,547,108 | 10/1985 | Nakama | 411/508 |
| 4,730,972 | 3/1988 | Sun et al. | 402/48 |

FOREIGN PATENT DOCUMENTS 2027836 2/1980 United Kingdom ............... 411/509

Primary Examiner—Frank T. Yost
Assistant Examiner—Paul M. Heyrana, Sr.
Attorney, Agent, or Firm—Skjerven, Morrill, MacPherson, Franklin & Friel

[57] ABSTRACT

A paper sheets binding system utilizes a two-part connector including a headed bifurcated inner ratcheted post binding member and a headed pawls-containing locking collar which is ratcheted down over the post member legs to cinch the heads either directly around punch-hole apertures in a paper sheets stack or against a pair of longitudinal binding strips on opposite marginal edges of the stack, with or without an affixed paper sheets cover. The post legs and pawls on the binding member and locking collar, respectively, are offset from the center of their heads so that upon assembly on a paper sheets stack to be bound, the connector element heads are asymmetric with respect to the apertures in the punch-hole paper stack. This allows the connector to better withstand asymmetric loading which is present when a book is purposely opened or accidentally dropped. The post legs contain an outer flat longitudinal section which minimizes their central thickness and allows for a cleaner, more accurate frangible breaking off of excess post leg lengths to accommodate various binding thicknesses. A simple hand tool is also included for disassembly of the locking collar pawls from an interlocking position with respect to the post ratchets.

26 Claims, 7 Drawing Sheets

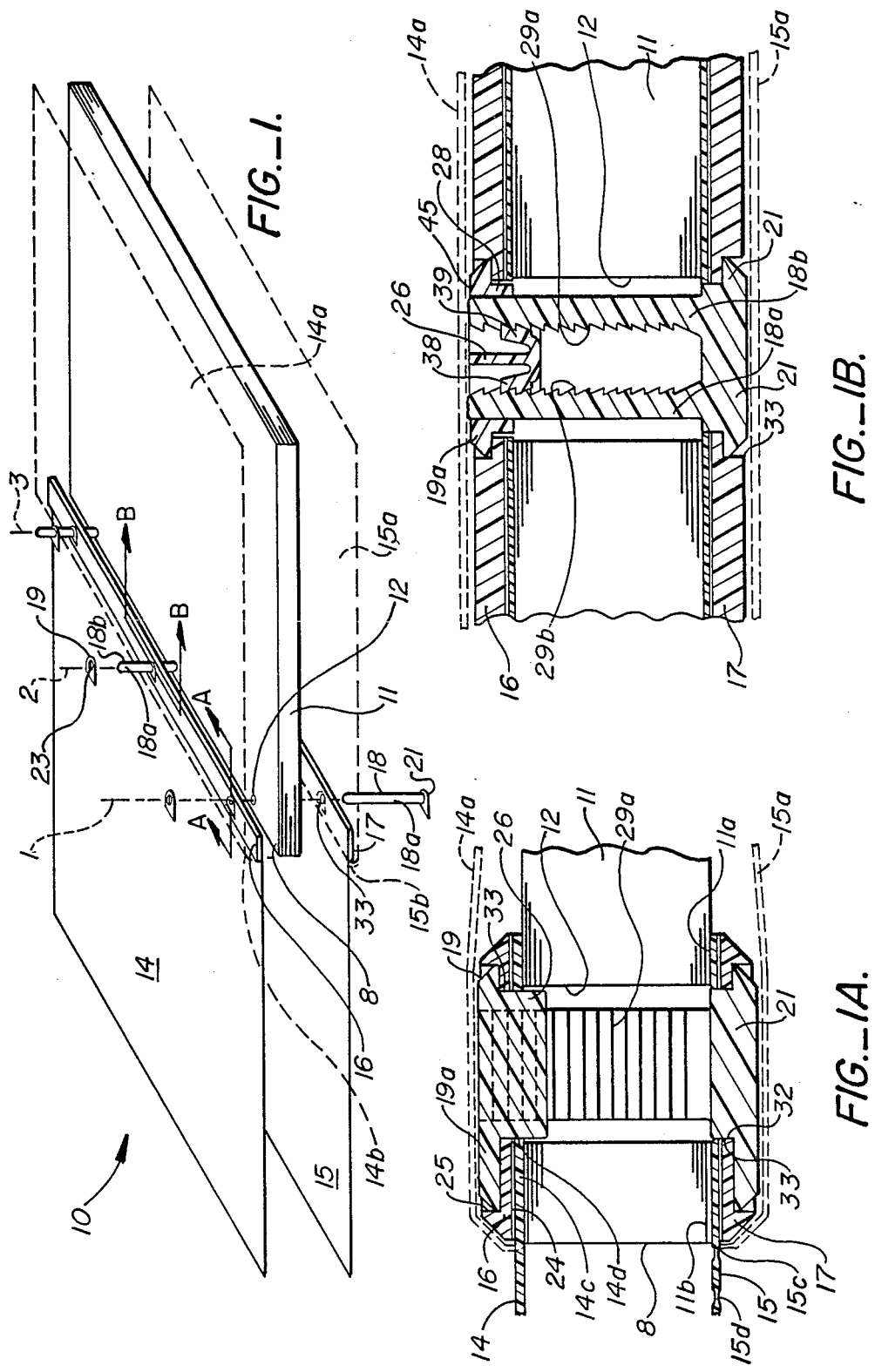

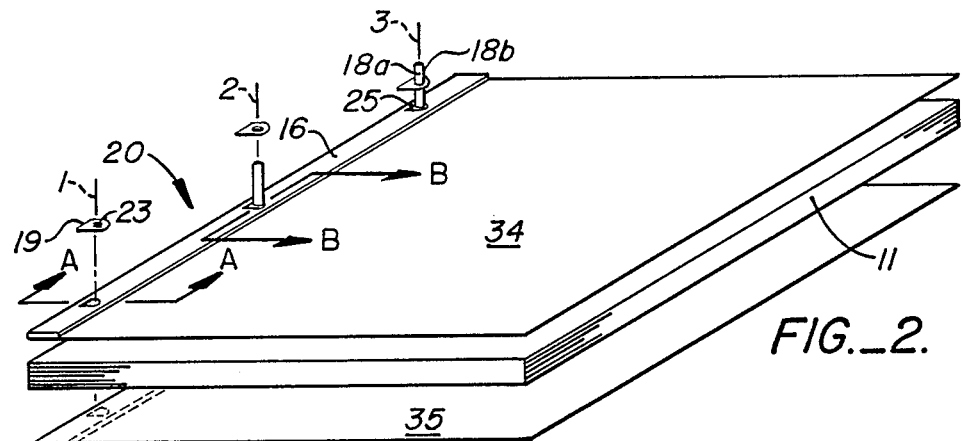
FIG._2.
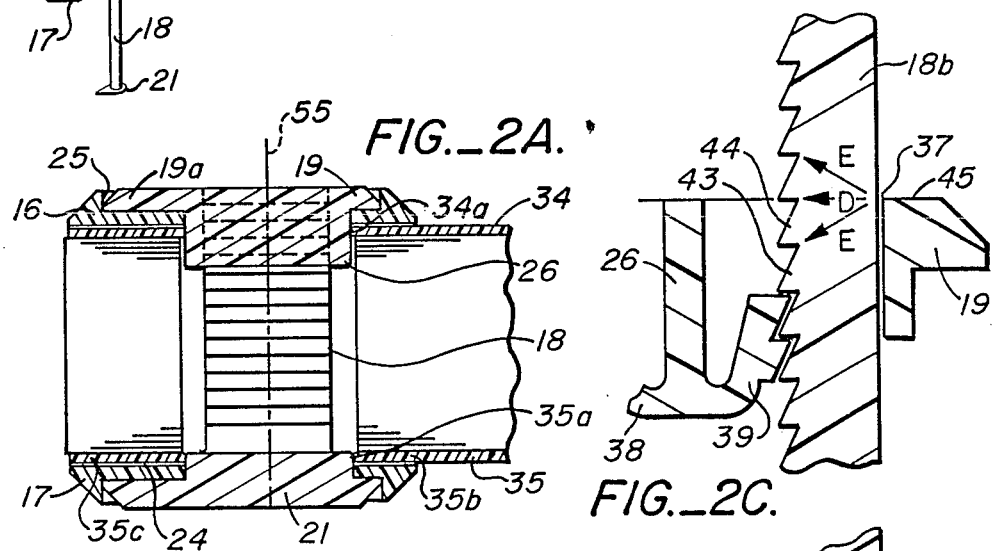
FIG._2A.
FIG._2C.
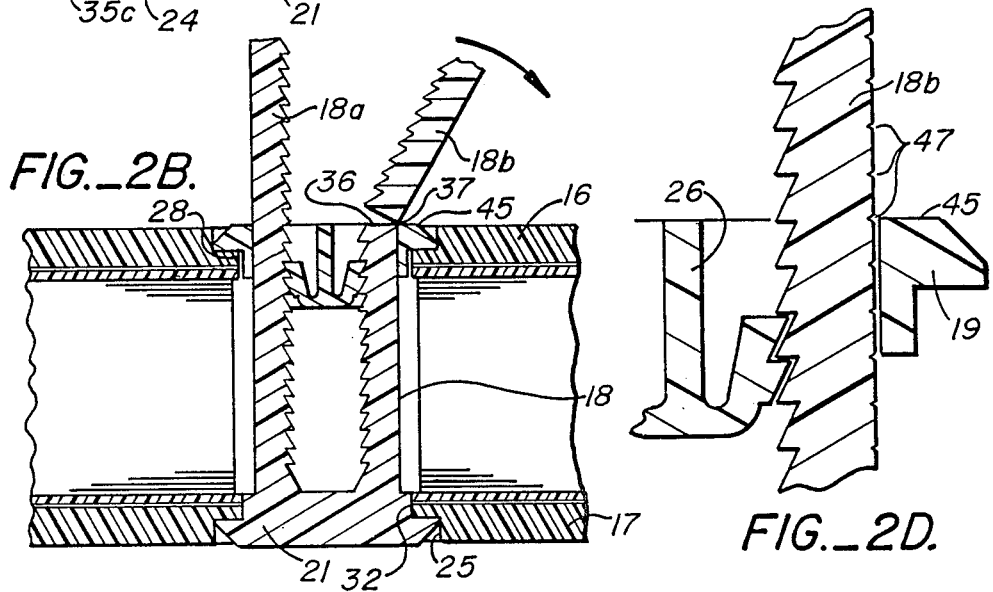
FIG._2B.
FIG._2D.

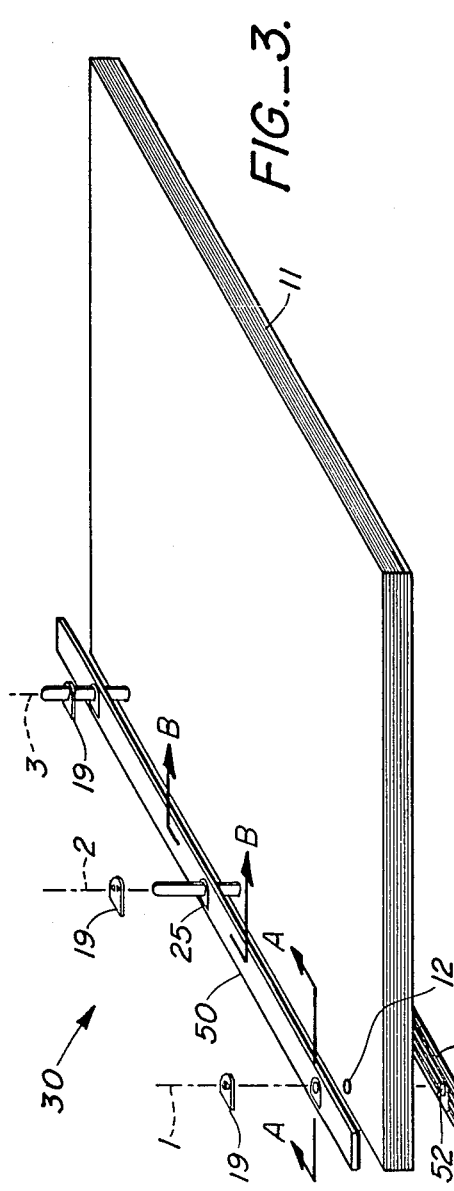
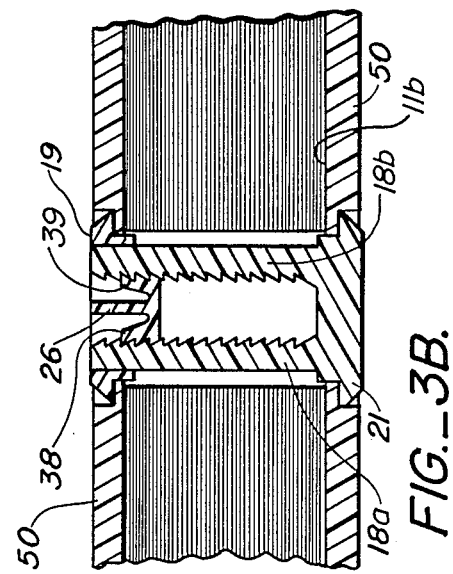
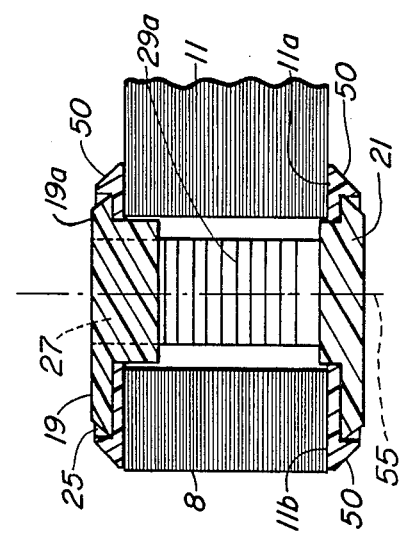

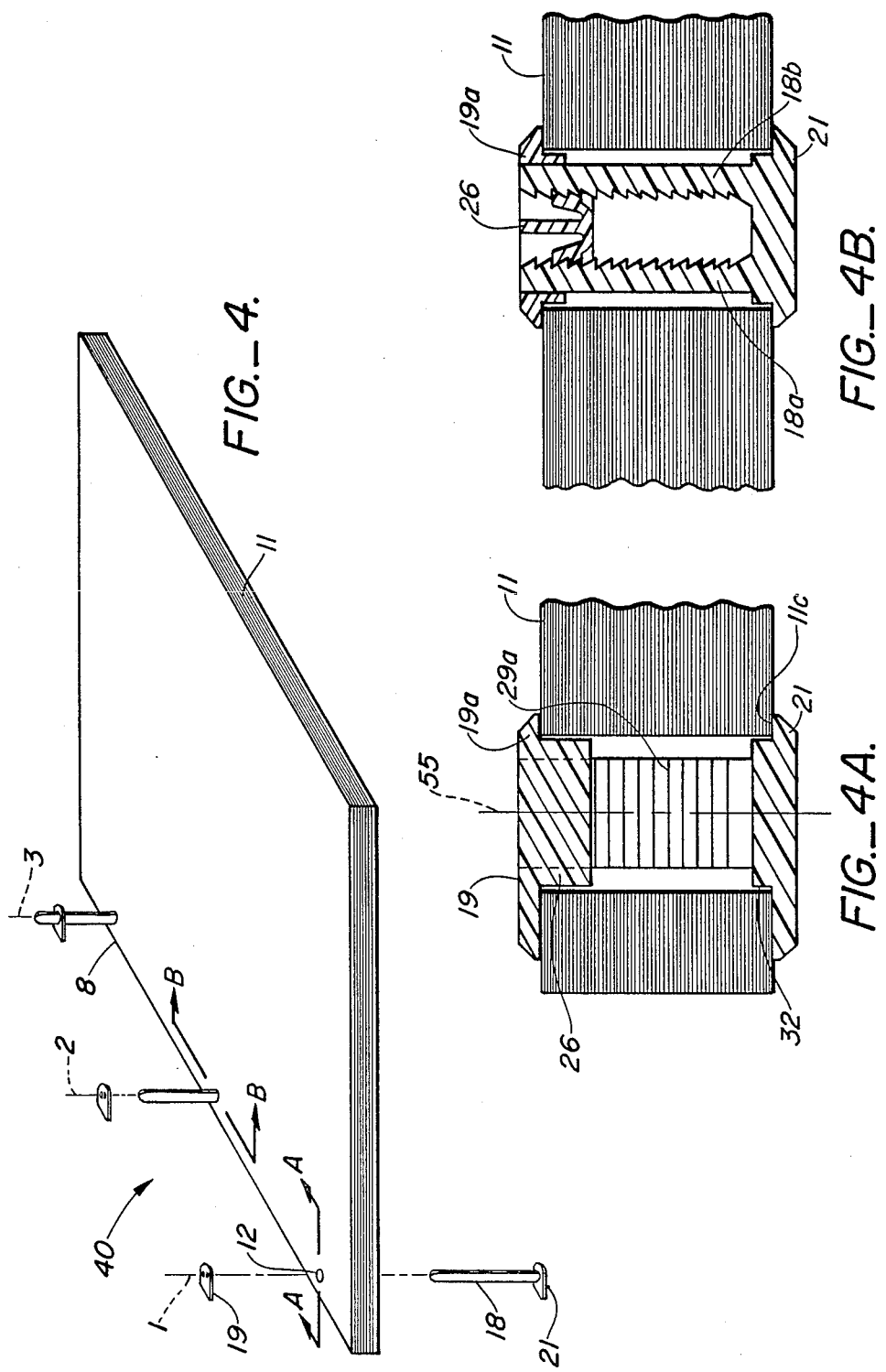

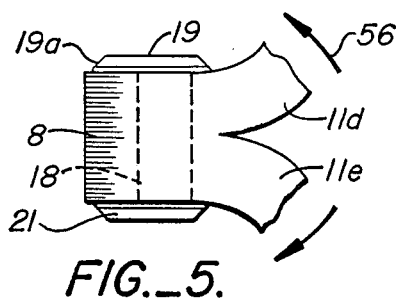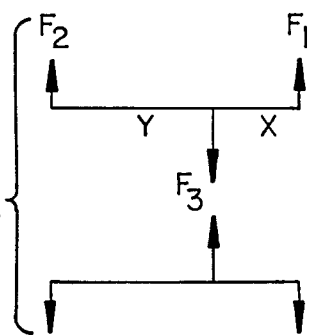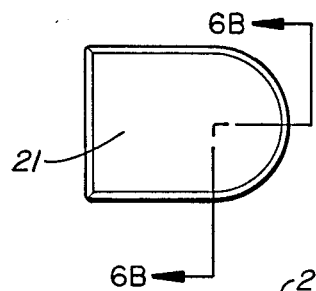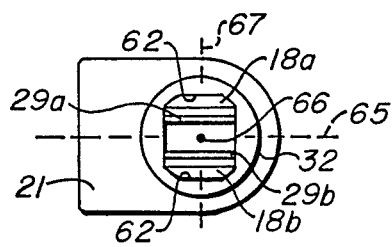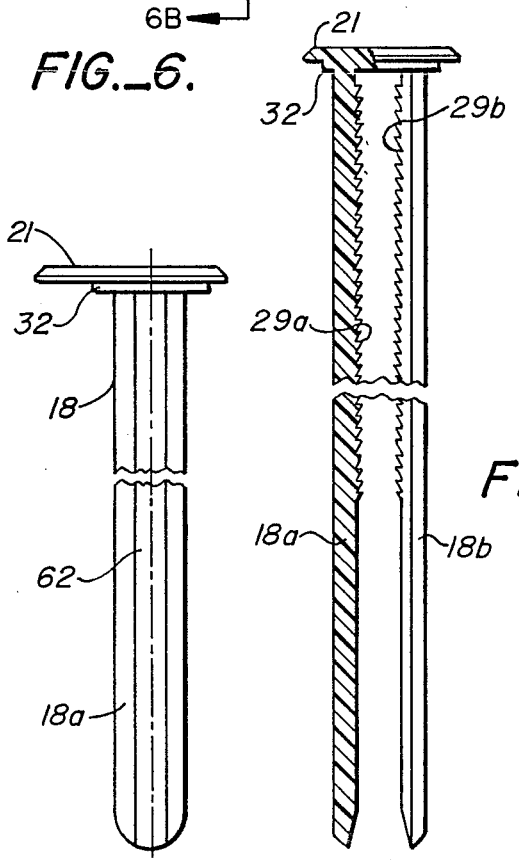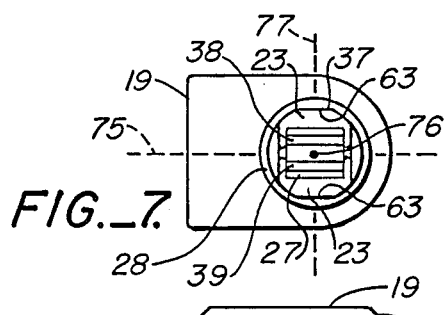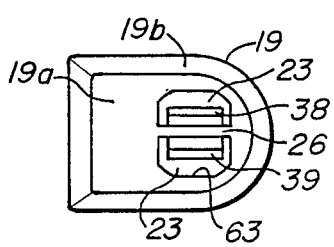

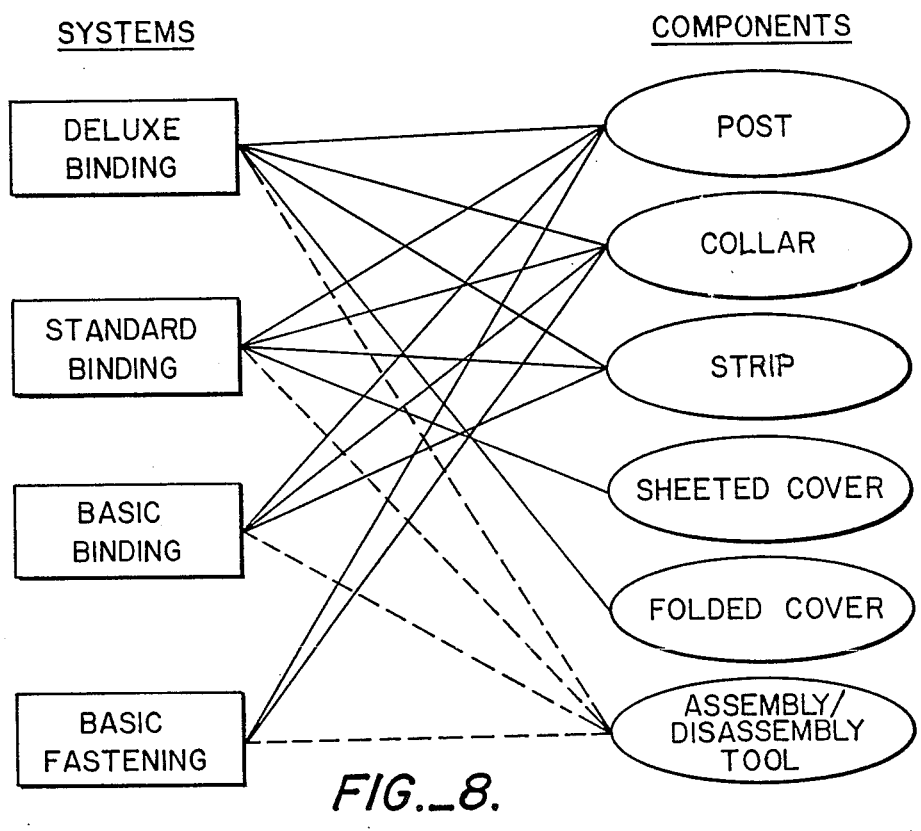
FIG._8.
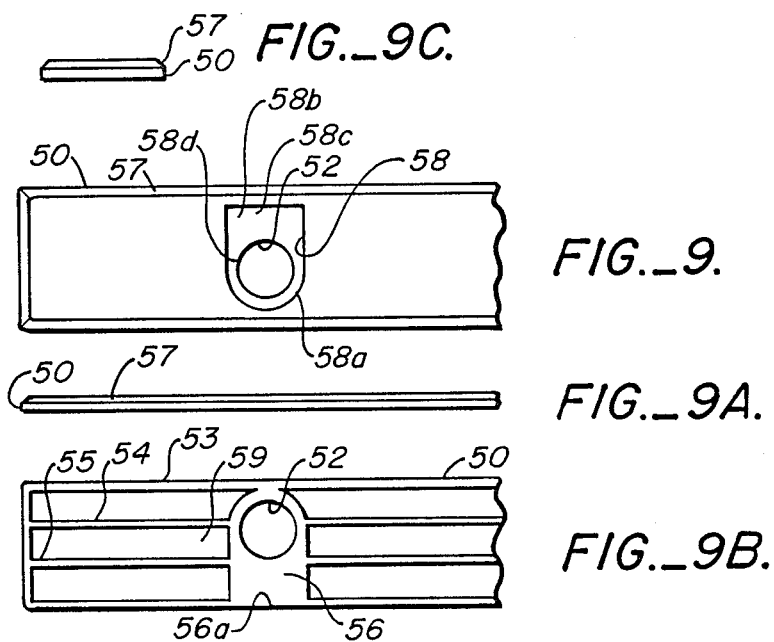
FIG._9C.
FIG._9.
FIG._9A.
FIG._9B.

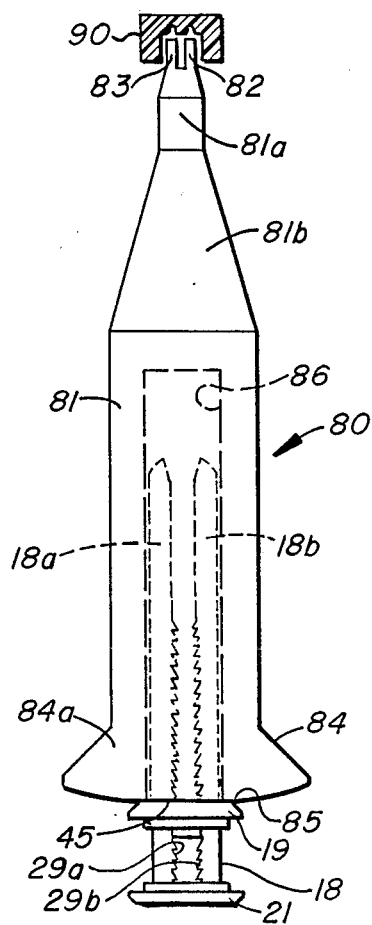
FIG._10.
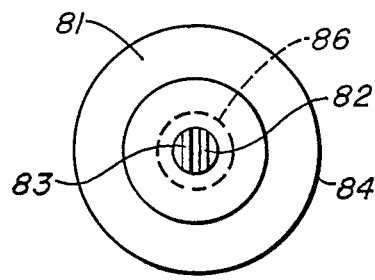
FIG._10A.
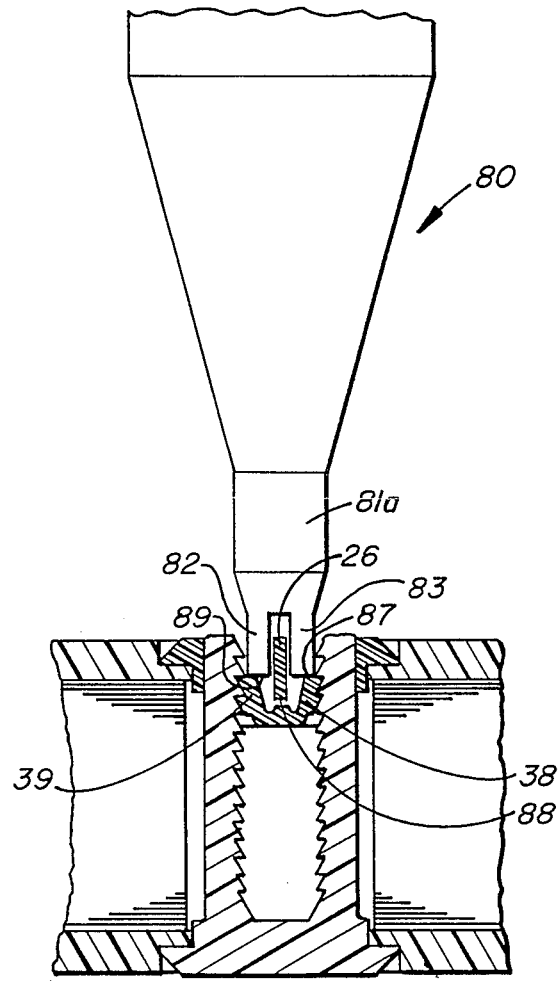
FIG._11.

PAPER SHEETS BINDING SYSTEM

RELATED APPLICATION

This application relates to U.S. applications Ser. No. 06/840,124 filed 3/14/86 now U.S. Pat. No. 4,730,972 and Ser. No. 06/924,374 filed 10/29/86, now U.S. Pat. No. 4,143,048, and Design applications Ser. No. 07/121,762, Ser. No. 07/121,763, and Ser. No. 07/121,764, filed herewith, all applications being assigned to the Assignee of this Application. The subject matter of these related Applications are incorporated herein by reference.

BACKGROUND OF THE INVENTION

1. Field of the Invention

This invention pertains to a paper sheets or book binding system for retaining and clamping an apertured margin portion of apertured material such as a stack of hole punched paper sheets. More particularly, the invention is directed to an improved binding connector(s) to bind a sheaf of papers into a bound report or booklet without a tool or any machine and to a novel binding strip and a novel binding strip and cover. A simple tool to debind a bound booklet which may also function to assist binding and rebinding is also contemplated.

Material Information

The first related Application discusses various binding systems utilized in the past including ACCO fasteners, spiral binders, and various interlocking through hole devices, exemplified by U.S. Pat. No. 3,970,331; 4,175,880; 4,369,013; 3,834,739; 1,841,989; U.K. Patent No. 950,768; and French Patent No. 2,505,262. The related Application itself discloses a first binding element including a bifurcated post having inwardly facing ratcheted surfaces with an integral square head or integrally attached binding strip, the post(s) being passed through punch hole aperture(s) of a paper stack. Also provided is a separate locking button with an integral head, used with or without a margin strip, which button includes one or two hinged pawls which are cinched on the bifurcated post with the pawls successively ratcheting on the post for clamping a stack of paper sheets between the respective heads or strips. Excess post length is broken-off adjacent this locking button.

SUMMARY OF THE INVENTION

An improved book binding system is disclosed which utilizes in its preferred embodiment an asymmetrically disposed bifurcated post on the head of one connector part and asymmetric disposed pawls on a head of a locking collar second connector part to compensate for connector load incident to the opening of the book. Further, a flattened outer edge on the bifurcated post and a flattened surface on the through apertures in the locking collar corresponding to the flattened post portions are provided to facilitate breaking-off of the excess of the bifurcated legs of the post.

Further, each of the binding member heads and locking collar heads have a D-configuration in a preferred embodiment. In a further improvement an integral circular rim is provided on the locking collar to facilitate entry of the locking collar particularly into a punch-hole aperture or strip circular aperture. The rim also prevents excessive splaying of the legs of the bifurcated post in the completed binding so that upon book opening, movement of the ends of the posts do not disengage the pawls of the locking collar from the post serrations.

An integral circular interference-fit rim is also provided extending from the underside of the post head which snaps or presses into an aperture of a binding strip employed with the binding connector and allows very accurate perpendicular orientation of the post(s) so that the punch-hole paper can be easily inserted thereover as well as allowing the strip to carry or transport the posts as if they were integral with the strip. Additionally, a pair U-shaped pawls are provided which extend upwardly from the bottom of a relatively deep central beam of the locking collar toward an outer plane of the locking collar. Improvements in the construction of the binding strips with or without attachment of paper sheets stack covers are also described.

The above improvements result in a binding connector used singly, doubly, or as a triplet (with three-hole punched paper), with or without binding strips. The invention allows a user to have:

(a) a modular system of mating components (a binding member and locking collar) which enables use as a single post and collar fastener up to a deluxe bound document for a stack of sheets;

(b) a system designed to withstand the asymmetric loading on a fastener resultant from the opening of the book;

(c) a permanent but updateable/correctable binding system by replacing only one of the elements i.e. the locking collar and its integral pawls;

(d) a system which does not necessitate the use of any machine or tool for assembly but which can employ a simple one-part hand tool for assembly, disassembly and reassembly of certain already used connector elements; and (e) complete reuseability of any binding strips and covers employed along with reuseability of the postlike binding element as long as it is not desired to bind a thicker document.

BRIEF DESCRIPTION OF THE DRAWING

FIG. 1 is an exploded perspective view of the invention prior to complete assembly of a deluxe binding.

FIG. 1A is a cross sectional view of the binding elements taken on the line A—A of FIG. 1.

FIG. 1B is a cross sectional view of the binding elements taken on the line B—B of FIG. 1.

FIG. 2 is an exploded perspective view of a strip and cover binding embodiment of the invention prior to complete assembly of a standard binding system.

FIG. 2A is a cross sectional view of the binding elements taken on the lines A—A of FIG. 2.

FIG. 2B is a cross sectional view of the binding elements showing breakage of a binding post taken on the lines B—B of FIG. 2.

FIG. 2C is a detailed cross sectional view of the pawl and post locking mechanism of FIG. 2B showing a critical orientation of the elements to obtain a clean frangible breaking of a post.

FIG. 2D is a cross sectional view of the pawl and post interlock including a modification of the post to facilitate breaking.

FIG. 3 is an exploded perspective view of a basic binding system including a pair of binding strips without a book cover.

FIG. 3A is a cross sectional view of the binding elements taken on the line A—A of FIG. 3.

FIG. 3B is a cross sectional view of the binding elements taken on the line B—B of FIG. 3.

FIG. 4 is an exploded perspective view of a basic fastening arrangement of the invention showing binding elements, per se.

FIG. 4A is a cross sectional view taken on the lines A—A of FIG. 4.

FIG. 4B is a cross sectional view taken on the lines B—B of FIG. 4.

FIG. 5 is a partial end view of the binding system of FIG. 4 showing asymmetric loading upon opening of the book.

FIG. 5A is a force diagram showing the vertical forces acting on the fastener system upon book opening.

FIG. 6 is a top view of the binding element including the bifurcated post.

FIG. 6A is a side view of the binding element of FIG. 6.

FIG. 6B is a cross sectional view of the binding element taken on the line B—B of FIG. 6.

FIG. 6C is a bottom view of the binding element of FIG. 6.

FIG. 7 is a bottom view of the locking collar of the invention.

FIG. 7A is a longitudinal side view of the locking collar.

FIG. 7B is a top view of the locking collar.

FIG. 8 illustrates an interrelationship matrix of the various binding and fastening systems with an indication of which components are employed with respect to each of the particular binding and fastening systems.

FIG. 9 is a top view of one end of the binding strip embodiment of FIG. 3.

FIG. 9A is a side view thereof.

FIG. 9B is a bottom view thereof.

FIG. 9C is an end view thereof.

FIG. 10 is a side view of a combination disassembly and assembly tool showing use as an assembly tool.

FIG. 10A is a bottom view of the tool of FIG. 10 less its protective cap.

FIG. 11 is a partial side view of the toll showing use as a disassembly tool.

DETAILED DESCRIPTION

FIG. 1 illustrates what is termed a deluxe binding 10. In this binding a stack of punched hole paper sheets 11 is provided with a pair of covers 14, 15 affixed respectively to a pair of binding strips 16 and 17. The covers and strips are positioned at a marginal edge 8 of the stack so that circular apertures in the covers 14, 15 and strips 16, 17 are aligned with apertures 12 of the paper sheet stack on the bottom and top of the paper sheet stack. A binding member 18 having an asymmetric head 21 is inserted into the apertures 33 of the strip, the cover apertures and through the stack apertures as seen in illustrated Steps 1, 2, and 3, in that order. At Step 2, the post legs 18a and 18b extend outwardly from strip 16. A locking collar 19 having a pair of matched apertures 23 is then placed over the bifurcated posts and slid down as shown at Step 3 so that a pair of pawls, incorporated into locking collar 19, ratchet down ratcheted surfaces 29a, 29b (FIG. 1B) on the inner facing periphery of legs 18a and 18b until the respective covers and binding strips are cinched down to bind the paper sheets stack. Any excess length of the bifurcated posts 18a and 18b are then snapped off or frangibly broken in the plane of a top surface 45 of the locking collar 19. The covers are then folded to dashed positions 14a and 15a, respectively, about hinges 14b and 15b to complete the overall binding. In this embodiment, the covers in their closed position conceal the heads 21, 19a of each of the binding members 18 and the locking collars 19.

FIG. 1A shows the foregoing in more detail. A series of recesses 25 are provided on the exposed surface of each of the strips 16 and 17. The heads 21 and 19a of the binding member and locking collar, respectively, nest within the recesses 25. In a preferred embodiment, the heads rest in a non-interference fit with the recess 25, although in other embodiments, an interference fit or ridge as in the first related application or a tab may be provided. A layer of adhesive 24, such as contact cement, adheres to the underside of strips 16 and 17 to a marginal edge band 14c of the covers. Marginal band 14c also covers portions 11a and 11b of marginal portions of the paper stack. A circular collar 32 of head 21 extends into a strip aperture 33 and a rim 28 of collar 19 extends into aperture 33 of strip 16. Rim 28 functions to give additional strength to the collar and helps to guide the legs during connector assembly. It also functions to prevent the splaying of the post legs, ensuring proper pawl tooth-to-ratchet tooth interlocking and preventing disengagement of the pawls from the leg ratchets by effectively lengthening the matched apertures 23 within the collar without thickening the collar head, thus preventing the fractured ends of the posts from slipping out underneath the locking collar when the connector is in tension due to page opening. Score lines 15c and 15d may also be provided in one or both covers particularly with thick covers so as to allow for easy opening of the cover.

As particularly seen in FIG. 1B, the bifurcated legs 18a and 18b have a series of transversed ratchets 29a and 29b extending along all or a portion of their overall length. Pawls 38 and 39 extend from a relatively deep medial bar 26 (FIG. 7B) extending between the matched apertures 23 in the head 19a of the locking collar. The pawls 38 and 39 of the locking collar are ratcheted down the leg ratchets 29a, 29b until the overall connector parts firmly cinch the edge margins of the paper stack by forcing the respective heads 21 and 19a of the binding member and the locking collar against the underside of the recess 25 in each of the strips. The excess of the post legs extending above the plane of surface 45 on the locking collar are then broken off as shown in FIG. 2B.

A so-called standard binding system 20 is shown in FIG. 2. This bound document differs from the deluxe binding of FIG. 1 in that the heads of the posts and collars nesting in the recesses of the binding strips, and the strips themselves, are visible in the closed document. Single cover sheets 34, 35 are adhesively affixed to the underside of the pair of binding strips 16, 17. As in FIG. 1, the binding member 18 is guided through the respective apertures in strip 17, sheet 35, paper stack 11, sheet 34 and strip 16 so that it emerges as seen in Step 2 exteriorally of strip 16. Locking collar 19 is then positioned on the post legs in Step 3 and ratcheted down the inside of the bifurcated post legs 18a and 18b until the locking collar is guided into the recess 25 and the stack of paper sheets cinched between the respective strips and covers at the punched hole margin edge of the paper stack. The excess post lengths are then frangibly broken off and the binding is completed.

As can be seen in FIG. 2A, the center line 55 of the ratcheted post and the pawl mechanism is asymmetric with respect to the center of the respective heads 21 and 19a of the binding member 18 and the locking collar 19. The pawls 38, 39 and the medial beam 26 extend through a circular aperture 34a in cover 34. A marginal portion 35b, 35c of the cover 35 extends between the underside of strip 17 and is affixed by adhesive 24 to the strip. Cover 34 is similarly adhered to the strip. Rim 32 extending inwardly from head 21 of binding member 18 is recessed into the circular apertures 33 in the strip. In assembly it has been found convenient to first insert the binding member into the recess 25 and to rest the strip 17, with its attached cover, and the exterior top surface head 21 on a flat horizontal work surface. The paper sheets are then placed over the vertically extending post legs 18a and 18b, and the other strip with its affixed cover inserted over the post. The locking collar is then placed on the ends of the post legs and ratcheted downward over the length thereof until the locking collar is positioned in the recess 25 of strip 16 and the outer marginal edges of the paper stack are firmly cinched together. At that position as shown in FIG. 2B, the pawls are interlocked with opposite ratchets of the legs 18a and 18b so that two internal leg ratchet teeth extend from above the upper end of the pawls to the plane of surface 45 of the locking collar. The excess leg lengths are frangibly broken by bending them around edge 37 so that a relatively smooth surface 36 is left at the end of the legs 18a, 18b.

As seen in FIG. 2C, pawl teeth of pawl 39 (and 38) are sized so that two parallel, safety ratchet teeth 43, 44, remain below the plane of the locking collar 19 top surface 45. The upper root of tooth 44 is at a distance D between the root and the aperture edges 37 of the collar 19. This distance D is shorter than the distances E between the edge 37 and the roots of the next lower tooth 43 and the first tooth extending above the plane of surface 45. This orientation of the tooth root upon bending of each bifurcated post leg as seen in FIG. 2B will break the leg off along the surface represented by arrow D rather than the longer surfaces E, thus giving a relatively smooth exterior aesthetically pleasing break surface. In a second embodiment shown in FIG. 2D, a series of parallel slots or score lines 47 may be molded perpendicularly into the post legs on the exterior surface of the legs at the same level as the root of each of the transverse ratchet teeth so that an even lesser distance D is present at the plane of surface 45 to facilitate a clean break.

FIG. 3 illustrates a so-called basic binding system in which a stack of paper sheets 11 are bound without a cover but with a pair of binding strips 50 and the aforementioned binding members 18 and locking collars 19. Similarly to the strips 16, 17 described above, strip 50 is apertured at 52 and the bifurcated legs of binding element 18 are passed therethrough and through the apertures 12 at and edge margin of the paper stack. As with the other modifications, the steps 1, 2 and 3 are illustrated showing how the binding element and locking collar are positioned and connected to form the overall binding. Colors of the strips and connector parts can be mixed or matched.

FIG. 3A and 3B illustrate in detail the use of the basic connector parts with strips 50. Strip 50 may include a series of longitudinal ribs 51 on their inner surfaces for giving additional rigidity and to minimize the amount of plastic utilized in the strips. The details of this strip are seen in FIGS. 9-9C infra.

The basic fastening system is seen in FIG. 4 where a system 40 includes three binding elements 18 which are positioned through each of three apertures 12 in a stack of paper sheets 11 and the binding elements and locking collars connected as previously described to cinch the marginal edge 8 of the paper stack sheets together.

FIGS. 4A and 4B show in more detail the basic fastening mechanism including the offset or asymmetric position of the head 19a and head 21 with respect to the center line 55 of the bifurcated posts and the pawls, respectively. The asymmetric nature of the connector member heads 19a, 21 allows for less strength in the connector members when the book is opened into sections 11d and 11e by opening forces shown by arrows 56 in FIG. 5 or forced downward in an opened position in a page copying machine. FIG. 5A is a graphical representation of the involved vertical forces. $F_3$, the resultant force on the overall connector is equal to the sum of the force $F_1$, applied at the inner portion of the respective head, and the force $F_2$, applied at the outer portion of the head, where those portions abut the edge of the paper stack or the recess of strips extending between the heads and the paper stack or cover. Therefore, in equation form $F_3 = F_1 + F_2$. Since the post 18 is asymmetrically positioned in the head, X and Y in FIG. 5A represent the distances between the center of the post and pawls and the force vectors F1 and F2. $F_1 X = F_2 Y$. Thus, the more the Y distance is greater than X distance, the lower $F_3$ will be relative to $F_1$. Less structure and less strength is needed in the connector when the connector is asymmetric with the larger distance Y extending from the connector to the peripheral marginal edge 8 of the paper stack or given a fixed strength connector, that connector can withstand greater opening forces than a connecting member with symmetrical heads. A similar force diagram is included for the bottom number of sheets 11e.

FIG. 6 is a top view of the locking element 18 showing head 21. FIG. 6A is a side view of the binding member showing the circular rim 32 insertable into strip aperture 33 and a flat side 62 on the exterior periphery of leg 18a. A similar "flat" is positioned opposite leg 18a on the exterior of leg 18b. This is more clearly shown in FIG. 6C where the surfaces 62 are shown oppositely disposed on legs 18a and 18b with serrations 29a and 29b facing each other. It is noted that the bisector 65 of the head 21 intersects with the bisector 67 of legs 18a and 18b at a point 66 which is offset from the center of head 21 along bisector 65. This illustrates the asymmetric nature of the posts with respect to the head.

FIG. 6B further illustrates the serrations 29a and 29b on legs 18a and 18b which may extend a majority of the way from the root of the head toward the tip of the legs 18a, 18b.

FIG. 7 illustrates a bottom view of locking collar 19 in which a pair of matched apertures 23 are provided on either side of pawls 38 and 39. The apertures have flat outer surfaces 63 corresponding to the flats 62 on the post legs over which the locking collar is inserted such that the flats 63 slide over legs flat surfaces 62 and a straight edge 37 (FIG. 2B) is provided opposite the root of a serration tooth. As shown, the pawls and matching apertures are offset along bisector 75 so that its intersection 76 with bisector 77 provides for an asymmetric locking collar head. The flat straight end of the locking collar and the straight flat end of the head 21 of the binding member are alignable in parallel to the outer marginal edge 8 of the paper stack or slightly offset inwardly therefrom. A slight taper 19b is included around the top surface of the locking collar head. Similarly, the binding member head 21 is edge tapered as seen in FIG. 6.

FIG. 8 is self-explanatory in that it shows the four varieties of binding systems possible with the described invention coupled with those post/collar/strip/sheeted cover and folded cover components which are utilized with various of the systems. The various components are designed to mate with each other and build systems of bound documents dependent on user's needs.

FIG. 9 illustrates a top side of binding strip 50 where D-shaped recesses or counterbores 58 are provided surrounding asymmetrically arranged circular apertures 52 which are aligned with the apertures 12 of the paper stack (FIG. 3) so that the component parts (paper stack, strips, and covers, if included) may receive the two-part connectors 18, 19. The D-shaped recess 58 comprises a semi-circular annular section 58a surrounding half of the aperture 52 and an essentially rectangular section 58b having a semicircular portion 58d surrounding the other half of aperture 52. The recess edge 58c is aligned parallel to a longitudinal edge of strip 50. The depth of the recess is about 0.9 mm and which allows a head 21 of the binding member 18 or head 19a of the locking collar 19, which have thicknesses of about 1.0 and 1.5 mm, respectively, to fit therein. In this embodiment, adhesive or glue affixes the top of the ribs to the covers. A tapered edge 57 is provided on the strip essentially for aesthetic purposes. FIGS. 9A and 9C show side and end views of the strip which in a preferred embodiment has an overall height of 1.7 mm. FIG. 9B illustrates the under, paper stack-facing, side of the binding strip. In order to conserve the use of plastic material and to save weight in shipping in the final bound document or book. recesses 59 are provided in the bottom surface leaving therebetween upstanding parallel ribs 53, 54, 55 for structural support. Further, a D-shaped, full rib thickness area 56 is provided which not only provides sufficient strength to withstand the $F_1$ and $F_2$ stress forces accompanying a book opening but also the stresses incident to the assembly of the locking collar on the posts against the strip recesses in cinching the overall binding connector elements on the paper stack margin for proper binding. Area 56 which shows a straight edge 56a at one edge of the overall strip is also useful in reminding a user that that is the edge which is to be parallelly aligned with the margin edge 8 of the paper stack which is to be bound, thus ensuring the proper asymmetric positioning of the binding connector heads as described with respect to FIG. 2. Parallel ribs 53, 54, and 55 extend longitudinally between each of three (in the case of a three-hole punched paper stack) raised areas 56 spaced along the strips.

FIG. 10 illustrates a binding connector disassembly tool 80 which may also be employed to initially assemble or reassemble the connector components. Tool 80 includes a cylindrical center section 81 and a smaller cylindrical probe end 81a connected to the center section by a conical section 81b. Integral with the probe section are a pair of pawl-engaging essentially flat rectangular tips 82, 83, preferably having curved ends as seen in FIG. 10A. A flared collar 84 extends from an opposite end of the tool. A longitudinal bore 86 is provided within the central section 81. The tool may be first used to assist in the ratcheting down of locking collar 19 on the ratchets 29a, 29b of binding member 18. In FIG. 10, the paper stack is not shown but as described above will have its binding margin edge held essentially between connector heads 19 and 21. The tool is placed over the extending posts as at position 3 in FIGS. 1, 2, 3, and 4 (preferably with the head 21 resting on a flat work surface) so that a flat surface 85 on collar 84, extending around the entrance to bore 86, seats on the flat surface 45 of the locking collar 19. Manual pressure may be applied by pressing one's fingers on the conical surface 84a of the flared tool collar 84 to push or ram the locking collar downwardly on the posts, ratcheting as it goes down, until the locking collar seats in a strip recess (if a binding strip is employed) or in an aperture 12 of the paper stack and the paper sheets stack is appropriately cinched or bound. The length of the bore 86 is such as to accommodate all the excess length of the binding member legs 18a, 18b so that even a very thin book of a few sheets can extend into the bore. To ensure safety, a rubber or other protective cap 90 may be force fit or screwed over tips 82, 83, which cap may also be pushed or lightly tapped to cinch the paper sheets.

The use of the tool 80 is seen in FIG. 11 where the ends 89 of tool tips 82, 83 when inserted into the matched apertures of locking collar 19 including flat surfaces 63 (FIG. 7) rest on upper flat end surfaces 87 of pawls 38, 39, respectively. The bound document would normally be resting on a firm flat work surface. The tool is then driven downwardly by slight hammer or human plam impact to shear the pawls either individually from medial bar 26 or together from the bottom of the bar as shown at 88. The strips, the covers, and the binding member are all resuable. Use of the latter is, however, then limited to a paper stack of the same or a few sheets greater than the original, due to the prior removal of the excess leg lengths but having two safety teeth remain. A new locking collar with integral pawls, of course, is necessary in reassembling the binding.

While the invention has been disclosed in terms of asymmetric aesthetically pleasing D-shaped heads, other asymmetric rectangular, square, oval, circular heads may be employed where the binding elements and pawls are offset laterally from the center of the heads with the long side, e.g. distance Y FIG. 5A, is extending to the stack margin edge.

The above description of embodiments of this invention is intend to be illustrative and not limiting. Other embodiments of this invention will be obvious to those skilled in the art in view of the above disclosure.

We claim:

1. An apertured paper sheets binding connector comprising:

a binding member including a pair of elongated parallel posts integrally extending from a common head, each of said posts including inwardly facing ratcheted surfaces extending from a planar inner surface and oppositely-disposed flat outwardly-facing surfaces parallel to said planar inner surface;

a locking collar having a pair of matching throughapertures, an integral medial cross-bar extending between and separating said apertures, and at least one pawl hingedly mounted to said cross-bar, said apertures including oppositely-disposed peripheral flat sections, corresponding to and allowing sliding passage of said posts outwardly facing flat surfaces therepast;

wherein said posts are insertable into at least one paper sheet aperture from one side of a stack of paper sheets and through said locking collar, said locking collar including a head juxtaposed to a paper sheet aperture on an opposite side of said stack of paper sheets; and wherein said at least one pawl ratchets along said at least one of said ratcheted surfaces until said posts flat head and said locking collar head clamp said paper sheets together; excess length of said posts being breakable across a cross section of said posts from a root of said ratchet surfaces across said posts to said posts flat surfaces generally in a plane of an exterior surface of said locking collar head.

2. The binding connector of claim 1 wherein said locking collar includes an integral circular rim having a diameter greater than a maximum width dimension of said posts extending from an interior surface of said locking collar, said rim being extendable towards a paper sheet aperture.

3. The binding connector of claim 1 further including a punch tool insertable into said locking collar along opposite sides of said cross-bar and against said pawls for shearing off said pawls to allow separation of a locked locking collar from said binding member.

4. The binding connector of claim 1 in which said locking collar head has an outer D-shaped configuration, the straight edge of said D-shaped head being alignable with an edge of a paper sheet stack margin adjacent said at least one paper sheet aperture, and wherein the curved edge of said D-shaped head generally surrounds said at least one paper sheets aperture; and
wherein said matching through-apertures of said locking collar are asymmetrically positioned along a bisector of said D-shaped head perpendicular to said straight edge of said D-shaped head.

5. The binding connector of claim 4 wherein said D-shaped head includes a semi-circular portion surrounding one-half of said at least one paper sheet aperture and a generally rectangular portion extending from said semicircular portion to said straight edge of said D-shaped head.

6. The binding connector of claim 1 including a pair of multi-apertured binding strips positionable along opposed margins of said stack of paper sheets adjacent said at least one paper sheet aperture; each aperture of each of said strips including a counterbore therein, a locking collar and binding member head being insertable oppositely into each of said counterbores in opposed ones of said pairs of strips; and wherein each of said counterbores is of a D-configuration and each of said locking collar heads and said binding member heads are of a D-configuration.

7. The binding connector of claim 6 further including a pair of apertured covers for said stack of paper sheets, said binding strips being affixed to an inner marginal edge of said cover.

8. The binding connector of claim 6 wherein said binding strips are clamped to said paper sheets stack at said margin by said binding members and said locking collars.

9. The binding connector of claim 8 further including a pair of apertured covers positioned between said stack of paper sheets and a inwardly-facing surface of said strips.

10. The binding connector of claim 9 wherein said covers are foldable 180° to overlie said strips and said binding member heads and locking collar heads after said posts have been frangibly broken.

11. The binding connector of claim 6 wherein each said D-shaped counterbore includes a circular aperture asymmetrically positioned along a bisector of said D-shaped counterbore perpendicular to a straight edge of said D-shaped counterbore.

12. The binding connector of claim 1 in which said binding member common head has an outer D-shaped configuration, the straight edge of said D-shaped common head being alignable with an edge of a paper sheets stack margin adjacent said paper sheets aperture, and the curved edge of said D-shaped common head generally surrounding said paper sheets aperture; and
wherein said posts are asymmetrically positioned along a bisector of said D-shaped common head perpendicular to said straight edge of said D-shaped common head.

13. The binding connector of claim 12 wherein said D-shaped common head includes a semi-circular portion surrounding one-half of a paper sheets aperture and a generally rectangular portion extending from said semicircular portion to said straight edge of said D-shaped head.

14. The binding connector of claim 1 including a multi-apertured binding strip positionable along a margin of said stack of paper sheets adjacent said paper sheets aperture; each aperture of said strip including a counterbore therein, said common head being insertable into each said counterbore; and wherein said counterbore is of a D-configuration and said common head is of a D-configuration.

15. The binding connector of claim 14 further including an apertured cover for said stack of paper sheets, said cover extending between said strip and stack of paper sheets.

16. The binding connector of claim 1 wherein said posts include a notched outwardly-facing surface to facilitate said frangible breaking.

17. An apertured paper sheets binding connector comprising:
a binding member including a pair of elongated parallel posts integrally extending asymmetrically from a common head, said posts including inwardly facing ratcheted surfaces;
a locking collar having a pair of matching throughapertures, an integral medial cross-bar extending between and separating said apertures, and at least one pawl hingedly mounted to said cross-bar, said apertures including oppositely disposed sections, corresponding to and allowing sliding passage of said posts therepast;
wherein said posts are insertable into at least one paper sheet aperture from one side of a stack of paper sheets and through said locking collar, said locking collar including an asymmetrical head juxtaposed to a paper sheet aperture on an opposite side of said stack of paper sheets;
wherein said at least one pawl ratchets along said at least one of said ratcheted surfaces until said posts common head and said locking collar head clamp said paper sheets together; excess length of said posts being frangibly breakable across a cross section of said posts from a root of said ratchet surfaces across said posts generally in a plane of an exterior surface of said locking collar head; and
wherein said locking collar includes an integral circular rim extending from an interior surface of said locking collar, said rim being extendable towards a paper sheets aperture.

18. The binding connector of claim 17 further including a punch tool insertable into said locking collar along opposite sides of said cross-bar and against said pawls for shearing off said pawls to allow separation of a locked locking collar from said binding member.

19. An apertured paper sheets binding connector comprising:
a binding member including a pair of elongated parallel posts integrally extending asymmetrically from a common head, said posts including inwardly facing ratcheted surfaces;
a locking collar having a pair of matching throughapertures, an integral medial cross-bar extending between and separating said apertures, and at least one pawl hingedly mounted, to said cross-bar, said apertures including oppositely disposed sections, corresponding to and allowing sliding passage of said posts therepast;
wherein said posts are insertable into at least one paper sheets aperture from one side of a stack of paper sheet and through said locking collar, said locking collar including an asymmetrical head juxtaposed to a paper sheets aperture on an opposite side of said stack of paper sheet;
wherein said at least one pawl ratchets along said at least one of said ratcheted surfaces until said posts common head and said locking collar head clamp said paper sheets together; excess length of said posts being frangibly breakable across a cross section of said posts from a root of said ratchet surfaces across said posts generally in a plane of an exterior surface of said locking collar head;
in which said common head and locking collar head have an outer D-shaped configuration, the straight edge of each of said D-shaped heads being alignable with an edge of a paper sheet stack margin adjacent said at least one paper sheet aperture, and wherein the curved edge of said D-shaped head generally surrounds said at least one paper sheet aperture; and
wherein said posts and said matching throughapertures of said locking collar are asymmetrically positioned along a bisector of each of said D-shaped heads perpendicular to said straight edge of each of said D-shaped heads.

20. The binding connector of claim 19 wherein each of said D-shaped heads includes a semi-circular portion surrounding one-half of said at least one paper sheet aperture and a generally rectangular portion ending from said semi-circular portion to said straight edge of each of said D-shaped heads.

21. The binding connector of claim 17 including a pair of multi-apertured binding strips positionable along opposed margins of said stack of paper sheets adjacent said at least one paper sheet aperture; and where each aperture of each of each of said strips includes a counterbore therein, a locking collar and binding member head being insertable oppositely into each of said counterbores in opposed ones of said pairs of strips.

22. The binding connector of claim 21 wherein each of said counterbores is of a D-configuration and each of said locking collar heads and said binding member heads are of a D-configuration.

23. The binding connector of claim 22 further including a pair of apertured covers for said stack of paper sheets, said binding strips being adhered to an inner marginal edge of said cover.

24. The binding connector of claim 21 wherein said posts common head includes an integral circular rim having a diameter greater than a maximum width dimension of said posts extending from an under surface of said common head, said rim being dimensioned to be in an interference or snap-in fit into said strip apertures.

25. An apertured paper sheets binding connector comprising:
a binding member including a pair of elongated parallel posts integrally extending asymmetrically from a common head, said posts including inwardly facing ratcheted surfaces;
a locking collar having a pair of matching throughapertures, an integral medial cross-bar extending between and separating said apertures, and at least one pawl hingedly mounted to said cross-bar, said apertures including oppositely disposed sections, corresponding to and allowing sliding passage of said posts therepast;
wherein said posts are insertable into at least one paper sheet aperture from one side of a stack of paper sheets and through said locking collar, said locking collar including an asymmetrical head juxtaposed to a paper sheet aperture on an opposite side of said stack of paper sheets;
wherein said at least one pawl ratchets along said at least one of said ratcheted surfaces until said posts common head and said locking collar head clamp said paper sheets together; excess length of said posts being frangibly breakable across a cross section of said posts from a root of said ratchet surfaces across said posts generally in a plane of an exterior surface of said locking collar head; and
wherein said posts and said matching throughapertures have oppositely disposed flat outward surfaces and flat inwardly-facing sections, respectively, for facilitating the frangible breaking of said posts.

26. An apertured paper, sheets binding connector comprising:
a binding member including a pair of elongated parallel posts integrally extending asymmetrically from a common head, said posts including inwardly facing ratcheted surfaces;
a locking collar having a pair of matching throughapertures, an integral medial cross-bar extending between and separating said apertures, and at least one pawl hingedly mounted to said cross-bar, said apertures including oppositely disposed sections, corresponding to and allowing sliding passage of said posts therepast;
wherein said posts are insertable into at least one paper sheet aperture from one side of a stack of paper sheets and through said locking collar, said locking collar including an asymmetrical head juxtaposed to a paper sheet aperture on an opposite side of said stack of paper sheets;
wherein said at least one pawl ratchets along said at least one of said ratcheted surfaces until said posts common head and said locking collar head clamp said paper sheets together; excess length of said posts being frangibly breakable across a cross section of said posts from a root of said ratchet surfaces across said posts generally in a plane of an exterior surface of said locking collar head; and
wherein said locking collar includes a pair of pawls hingedly extending upwardly from a bottom surface of said cross-bar, said pawls having an upper pawl tooth extending below at least two ratchets of said posts ratcheted surfaces extending below an exterior plane of said locking collar.

* * * * *